US012770355B2

(12) United States Patent
Woo et al.

(10) Patent No.: US 12,770,355 B2
(45) Date of Patent: Oct. 20, 2026

(54) SYSTEM AND METHOD FOR DETECTING OBJECT IN UNDERGROUND SPACE

(71) Applicants: GWANGJU INSTITUTE OF SCIENCE AND TECHNOLOGY, Gwangju (KR); KEPCO KDN Co., Ltd., Jeollanam-do (KR)

(72) Inventors: Seongje Woo, Jeollanam-do (KR); Dougje Woo, Daejeon (KR); Kyoobin Lee, Gwangju (KR); Taeri Kim, Gwangju (KR); Jemo Maeng, Gwangju (KR); Sungho Shin, Gwangju (KR); Joosoon Lee, Gwangju (KR)

(73) Assignees: GWANGJU INSTITUTE OF SCIENCE AND TECHNOLOGY, Gwangju (KR); KEPCO KDN CO., LTD., Jeollanam-Do (KR)

( * ) Notice: Subject to any disclaimer, the term of this patent is extended or adjusted under 35 U.S.C. 154(b) by 371 days.

(21) Appl. No.: 18/454,734

(22) Filed: Aug. 23, 2023

(65) Prior Publication Data

US 2024/0177444 A1 May 30, 2024

(30) Foreign Application Priority Data

Nov. 29, 2022 (KR) ........................ 10-2022-0163299

(51) Int. Cl.
*G06V 10/25* (2022.01)
*G06T 5/20* (2006.01)
(Continued)

(52) U.S. Cl.
CPC ................ *G06V 10/25* (2022.01); *G06T 5/20* (2013.01); *G06T 5/80* (2024.01); *G06V 10/44* (2022.01);
(Continued)

(58) Field of Classification Search
None
See application file for complete search history.

(56) References Cited

U.S. PATENT DOCUMENTS 7,825,956 B2 * 11/2010 Sumida ................ H04N 17/002 382/153
11,277,544 B2 * 3/2022 Powell .................. H04N 23/55
(Continued)

FOREIGN PATENT DOCUMENTS

KR 102303399 B1 9/2021
KR 20220089602 A 6/2022
(Continued)

OTHER PUBLICATIONS

Xue et al. "Learning to Calibrate Straight Lines for Fisheye Image Rectification", arXiv:1904.09856v2 [cs.CV] May 1, 2019. (Year: 2019).*
(Continued)

*Primary Examiner* — Randolph I Chu
(74) *Attorney, Agent, or Firm* — Heidi Eisenhut; LOZA & LOZA, LLP

(57) ABSTRACT

Provided is a system for detecting an object in an underground space. The system for detecting the object in the underground space includes a movable body moving in the underground space, a wide-angle camera mounted on the movable body to photograph an underground facility in the underground space, an object detection terminal configured to receive an image of the underground facility photographed by the wide-angle camera and correct a corresponding distorted image so as to detect the underground facility corresponding to an object set within the corrected image; and a communication network configured to enable network communication between the movable body and the object detection terminal. Thus, the system may have an effect of robustly detecting the object in an image with a large change
(Continued)

in size of an object formed on an image according to the distortion and distance such as the wide-angle or omnidirectional camera.

20 Claims, 6 Drawing Sheets

(51) Int. Cl.

| | |
|---|---|
| ***G06T 5/80*** | (2024.01) |
| ***G06V 10/44*** | (2022.01) |
| ***G06V 10/764*** | (2022.01) |
| ***G06V 20/56*** | (2022.01) |
| ***H04N 23/698*** | (2023.01) |

(52) U.S. Cl.
CPC ............ *G06V 10/764* (2022.01); *G06V 20/56* (2022.01); *H04N 23/698* (2023.01); *G06V 2201/07* (2022.01)

(56) References Cited

U.S. PATENT DOCUMENTS

| | | | | |
|---|---|---|---|---|
| 11,462,053 | B2 * | 10/2022 | Song | G06V 20/56 |
| 11,749,022 | B2 * | 9/2023 | Li | G06N 3/0464 382/103 |
| 12,567,082 | B2 * | 3/2026 | Cella | G06Q 30/0206 |
| 2002/0057345 | A1 * | 5/2002 | Tamaki | G06T 5/80 348/207.99 |
| 2019/0104252 | A1 * | 4/2019 | Starr | H04N 23/45 |
| 2019/0219518 | A1 * | 7/2019 | Nakamura | G03B 17/561 |
| 2020/0021727 | A1 * | 1/2020 | Ikeda | G01B 11/26 |
| 2020/0234413 | A1 * | 7/2020 | Park | G06T 15/205 |
| 2020/0267310 | A1 * | 8/2020 | Zhang | G06T 3/047 |
| 2020/0294257 | A1 * | 9/2020 | Yoo | G06N 3/084 |
| 2022/0257001 | A1 * | 8/2022 | Christensen | F16M 13/04 |
| 2023/0421732 | A1 * | 12/2023 | Tal | G08G 1/0141 |
| 2024/0046612 | A1 * | 2/2024 | Panetta | G06T 7/0004 |
| 2026/0045088 | A1 * | 2/2026 | Abhyanker | G06V 20/52 |

FOREIGN PATENT DOCUMENTS

| | | | | | |
|---|---|---|---|---|---|
| KR | 102924781 | B1 * | 2/2026 | | G16H 50/70 |
| WO | WO-2019152572 | A1 * | 8/2019 | | G02B 27/01 |

OTHER PUBLICATIONS

Simplilearn, "Convolutional Neural Network Tutorial (CNN) | How CNN Works | Deep Learning Tutorial | Simplilearn", https://www.youtube.com/watch?v=Jy9-aGMB_TE&t=18s, Jun. 19, 2018 (Year: 2018).*

* cited by examiner

SYSTEM AND METHOD FOR DETECTING OBJECT IN UNDERGROUND SPACE

CROSS-REFERENCE TO RELATED APPLICATIONS

The present application claims priority under 35 U.S. C. 119 and 35 U.S.C. 365 to Korean Patent Application No. 10-2022-0163299 (filed on 29 Nov. 2022), which is hereby incorporated by reference in its entirety.

BACKGROUND

The present disclosure relates to a system and method for detecting an object in an underground space. The present disclosure relates to a system and method for detecting an object in an underground space, in which a convolutional filter modified to match camera distortion is utilized. The present disclosure relates to a system and method for detecting an object in an underground space, in which a convolutional filter modified to match camera distortion is utilized to increase in detection rate of the object by utilizing a model of deep learning technology for detecting the object that is a region of interest (ROI) without correction of an object having large distortion or size change in an underground facility image photographed using a movable body so as to diagnosis of the underground facility.

In a method for detecting an object according to the related art, an object is detected based on an algorithm that is applicable to a situation at which a degree of distortion or a size change of the object in an image is small. As a related technology, there is Korea Patent Registration No. 10-2303399 (Sep. 13, 2021). Therefore, there is a limitation in that it is difficult to be applied to a situation in which the distortion of the object is large, or the degree of change is large. An existing algorithm for detecting the object may be applied to an image of a wide-angle camera having a wide region of interest (ROI). In this case, there is a limitation in that detection performance is deteriorated due to the distortion or change in object size according to a distance. In an image of a general camera having a narrow region of interest (ROI), the image change is small. For this reason, there is a limitation in that only a small range of an object may be detected with one operation using an object detection model.

Particularly, the algorithm for detecting the object according to the related art uses a fixed convolutional filter even for the same object when the size or shape is different. For this reason, there is a limitation in that the object detection rate decreases.

SUMMARY

Embodiments provide a system and method for detecting an underground facility, in which a convolutional filter modified to match camera distortion capable of robustly detecting an object is utilized for an image having a large change in size of an imaged object according to distortion and distance, such as a wide-angle or omnidirectional camera.

Embodiments also provide a system and method for detecting an underground facility, in which a convolutional filter modified to match camera distortion is utilized to be modified in response to all camera-specific parameters, to detect an image even if a size or shape of the same object is different, and to detect an object on an image having a wide region with excellent performance by using a wide-angle camera.

Embodiments also provide a system and method for detecting an underground facility, in which a convolutional filter modified to match camera distortion is utilized to detect and diagnose facilities or establishments disposed at both surfaces because the facilities on a wide region are detected using only one wide-angle device.

In one embodiment, an object detection terminal of a system for detecting an object in an underground space, which utilizes a convolutional filter modified to match camera distortion includes: a communication unit configured to communicate with the moving object and receive an image of an underground facility, which is acquired by being captured by the camera; a convolution filter generation unit configured to generate the convolution filter that matches a distortion shape of the camera; a main control unit configured to correct the distortion by applying the convolutional filter generated in the convolution filter generation unit to the underground facility; a feature extraction unit configured to generate a feature map through convolution operation so as to infer a region from the image of which the distortion is corrected by the main control unit; and an object classification module configured to receive the feature map as an input so as to classify the objects contained in the inferred region.

In the main control unit of the system for detecting the object in the underground space, which utilizes the convolutional filter modified to match the camera distortion, when the convolutional filter is applied to the image of the underground facility, the main control unit may use the following Equation 2:

$$y(p_c) = \sum_{p_n \in N} w(p_n) \cdot x(p_c + p_n),$$

where x is an input of an i-th layer, y is an output of the i-th layer, $y(p_c)$ is an output value of the convolution filter comprising $p_c$ at a center of the filter, $p_c$ is a position on a feature vector at which a filter center operation occurs, $w(p_n)$ is a weight at a $p_n$ position of the filter, $x(p_c+p_n)$ is an input value at the $p_n$ position based on the $p_c$ position of the input feature vector, N is the number of inputs for the convolution filter to be used for operation, and p is an n-th coordinate used by the convolution filter for an operation.

In the feature map generated d through the feature extraction unit of the system for detecting the object in the underground space, which utilizes the convolutional filter modified to match the camera distortion, a plurality of anchor boxes having different sizes may be assigned to the object so as to detect the object.

The main control unit of the system for detecting the object in the underground space, which utilizes the convolutional filter modified to match the camera distortion may correct the distortion by using the convolutional filter of the following Equation 6:

$$y(p_c) = \sum_{p_n \in N} w(p_n) \cdot x(p_c + p_n + \Delta p_n)$$

In another embodiment, a method for detecting an object in an underground space, which utilizes a convolutional filter modified to match camera distortion includes: (a) photographing an underground facility by a wide-angle camera mounted on a movable body; (b) acquiring an image of the underground facility, which is photographed by the wide-angle camera to transmit the image to an object detection terminal; (c) allowing the object detection terminal to receive the image of the underground facility and a parameter of the camera; (d) allowing the object detection terminal to generate the convolutional filter that matches the distortion of the camera using the camera parameter; (e) allowing the object detection terminal to constitute an object detection model and learns an corresponding object detection model; (f) allowing the object detection terminal to classify which object is included in an inferred region using the feature map and classify which object is included in a corresponding region using a convolutional layer; and (g) allowing the object detection terminal to visualize the object into an object bounding box.

The details of one or more embodiments are set forth in the accompanying drawings and the description below. Other features will be apparent from the description and drawings, and from the claims.

DETAILED DESCRIPTION OF THE EMBODIMENTS

Figure 1:
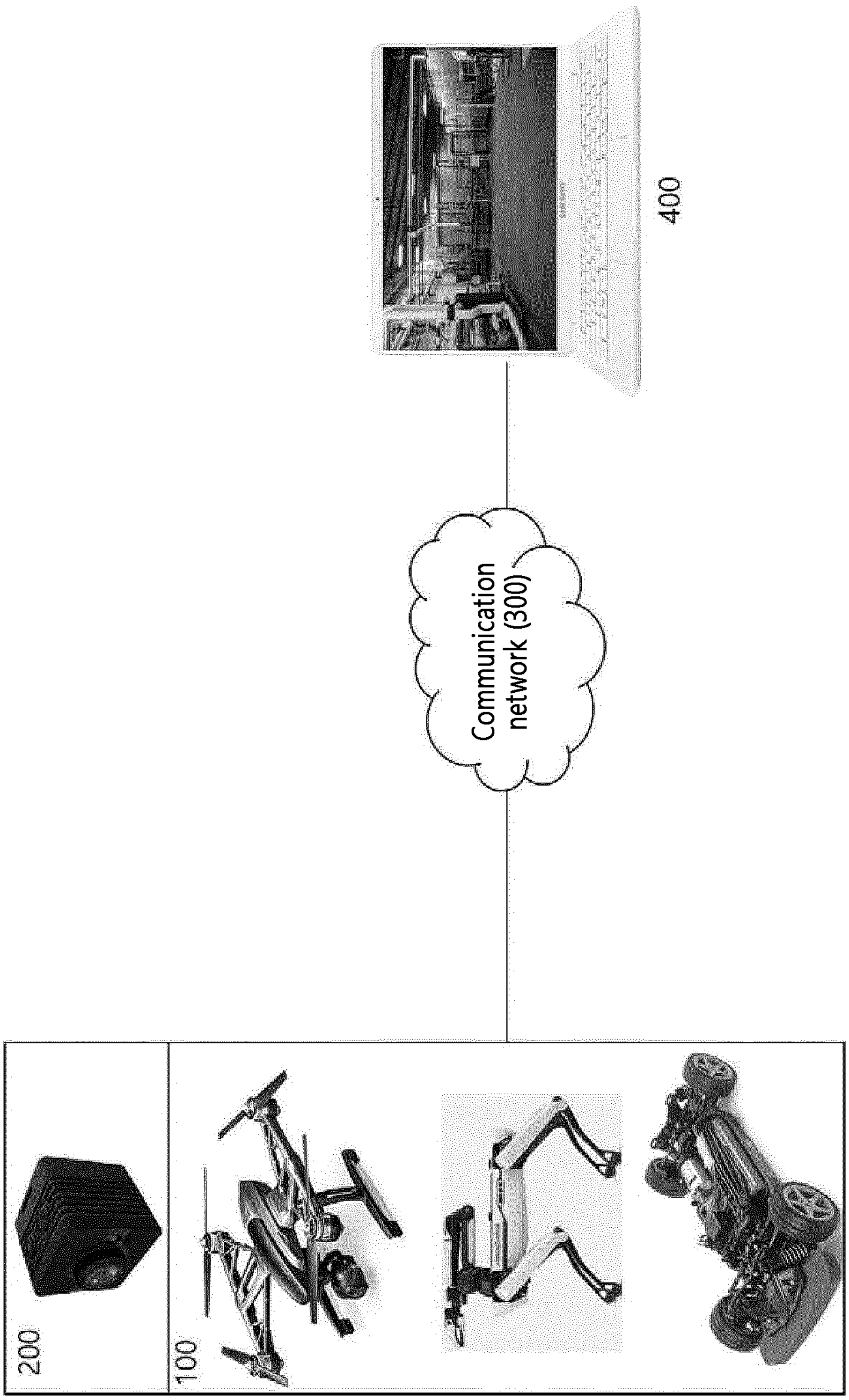
FIG. 1 is a view illustrating a system for detecting an object in an underground space using a convolutional filter modified according to camera distortion according to the present disclosure.

Terms or words used in this specification and claims should not be construed as being limited to ordinary or dictionary meanings and should be interpreted as meaning and concept consistent with the technical spirit of the present invention by the inventor based on that he/she is able to define terms to describe his/her invention in the best way to be seen by others.

Since the embodiments described in this specification and the configurations shown in the drawings are only one most preferred embodiment of the present invention and do not represent all of the technical ideas of the present invention, it should be understood that there may be various equivalents and modifications that can be substituted for them at the time of this application.

Hereinafter, a system and method for detecting an object in an underground space using a convolutional filter modified to match camera distortion according to the present disclosure will be described in detail with reference to the accompanying drawings.

First, as illustrated in FIG. 1, a system for detecting a facility using a convolutional filter modified to match camera distortion according to the present disclosure may include a movable body 100, a wide-angle camera 200, a communication network 300, and an object detection terminal 400.

The movable body 100 may include a movable drone, robot, or RC car for diagnosing the underground facility. The wide-angle camera 200 may be mounted on the above-described various movable bodies 100 to photograph the underground facility.

Figure 2:
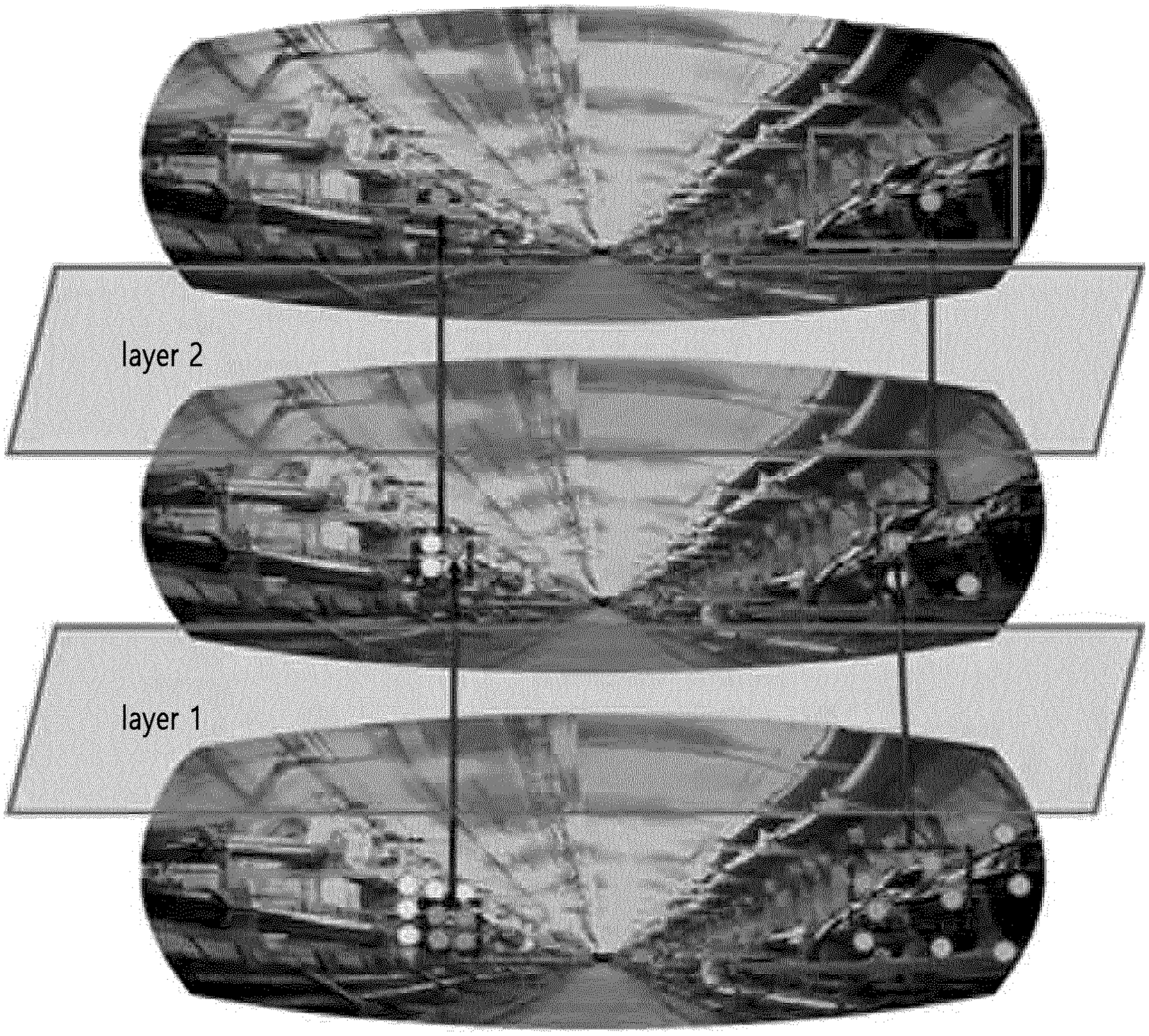
FIG. 2 is a view illustrating an example of a distorted image photographed by a wide-angle camera of the system for detecting the object in the underground space using the convolutional filter modified to match camera distortion according to the present disclosure.

The wide-angle camera 200 may use at least one of a wide-angle lens or an ultra-wide-angle lens, which has a wide field of view (FOV). The wide-angle camera may see a range wider than that of a camera using a general lens. However, as a result, as illustrated in FIG. 2, image distortion may be severe.

The movable body 100 may transmit an image photographed by the wide-angle camera 200 to the object detection terminal 400 through the communication network 300.

The object detection terminal 400 may receive an image photographed by the wide-angle camera 300. The terminal 400 may detect an object that is a region of interest (ROI) set in the image. The object detection terminal may be a laptop computer, a desktop PC, or a tablet PC. The object detection terminal 400 may receive the image photographed by the wide-angle camera 300. The object detection terminal 400 may correct the image distortion into a normalized image. The object detection terminal 400 may detect an object corresponding to the region of interest (ROI) in the corrected image.

Figure 3:
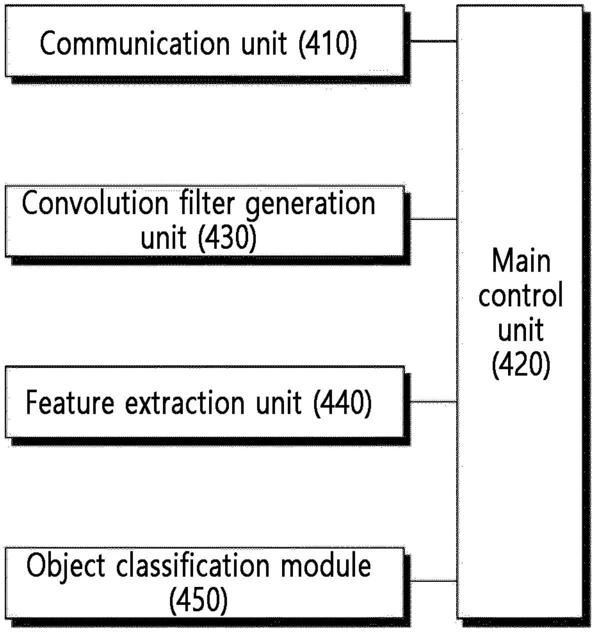
FIG. 3 is a block diagram illustrating an object detection terminal of the system for detecting the object in the underground space using the convolutional filter modified to match the camera distortion according to the present disclosure.
Figure 4:
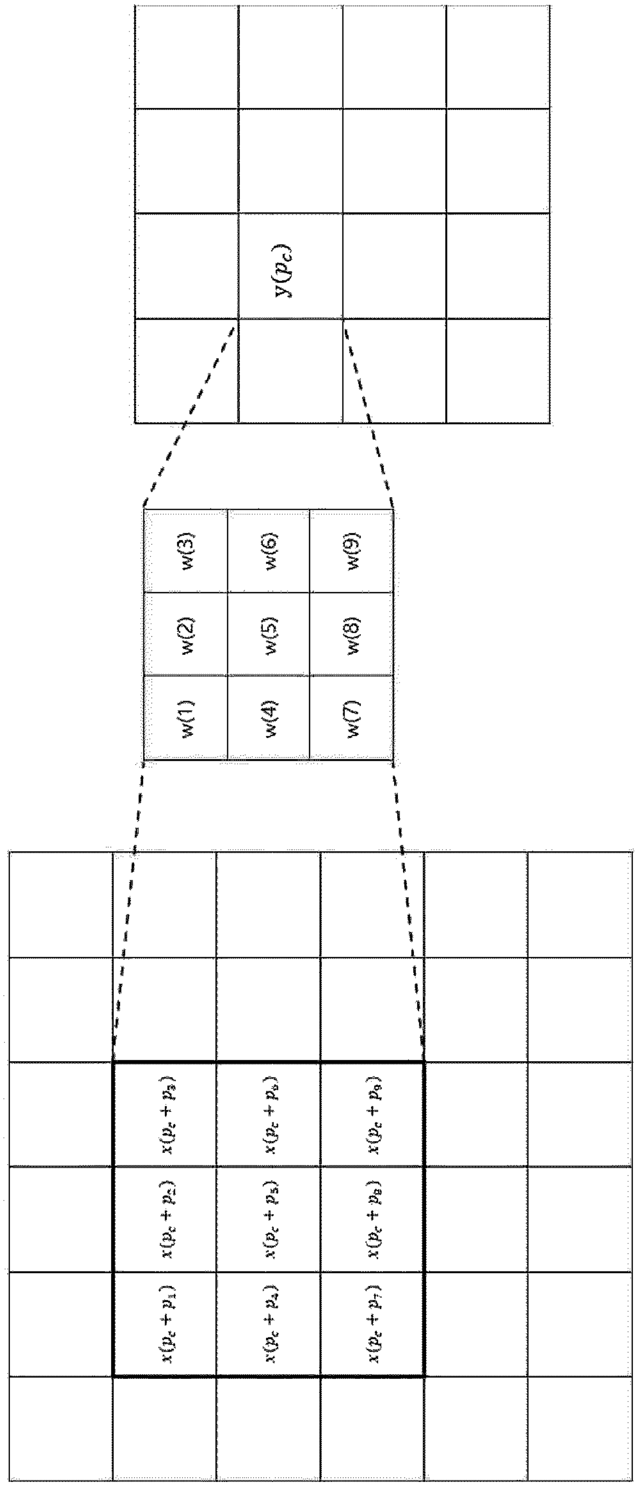
FIG. 4 is a view illustrating an example of applying the convolutional filter of the system for detecting the object in the underground space using the convolutional filter modified to match the camera distortion according to the present disclosure.

As illustrated in FIG. 3, the object detection terminal 400 may include a communication unit 410, a main control unit 420, a convolution filter generation unit 430, and a feature extraction unit 440. The communication unit 410 may communicate with the movable body 100. As a result, the terminal 400 may receive an image of an underground facility, which is acquired by being photographed by the wide-angle camera 200. The convolution filter generation unit 430 may generate a convolution filter that matches a distortion shape of the wide-angle camera 300. Here, the meaning of 'matching' may mean corresponding to the distortion of the wide-angle camera. For example, the meaning of 'matching' may correspond to a camera parameter.

The convolution filter generation unit 430 may consider the camera parameter to generate a filter (here, the filter may mean the convolution filter). The above parameter may be transmitted from the movable body. For example, the camera parameter may include a focal length, an angle of view, and a relative aperture of a lens. The angle of view may be related to the lens. The relative aperture may be related to the lens. At least one of the angle of view and the relative aperture may be related to a factor other than the lens. At least one of the angle of view and the relative aperture may be related to other components of the camera other than the lens. The convolution filter generation unit 430 may use a convolutional neural network (e.g., ResNet-101). For example, the feature extraction network may be defined as [Equation 1]. [Equation 1] may be defined as a set of functions. [Equation 1] may be a set of convolution filters for extracting features. The convolution filter generation unit 430 may generate the convolution filter.

$$f = \langle f_1, f_2, \ldots \ldots, f_l \rangle F_i = f_i(x) \quad i = (1, 2, \ldots \ldots, l) \qquad \text{[Equation 1]}$$

In [Equation 1], i may be the number of layers constituting the network, $F_i$ may be a feature vector passing through the i-th layer, x may be a feature vector passing through the i-th layer, and fi(.) may be an operation of the i-th layer of a CNN network constituted by a sliding window algorithm.

The main control unit 420 may apply the convolutional filter generated by the convolutional filter generation unit 430 to the distorted image. Here, the distorted image may be a distorted image of the underground facility.

The convolution filter may be provided using [Equation 2] below.

$$y(p_c) = \sum_{p_n \in N} w(p_n) \cdot x(p_c + p_n) \qquad \text{[Equation 2]}$$

The i-th layer may be assumed. In this case, in [Equation 2], x may be an input of the i-th layer, y may be an output of the i-th layer, $y(p_c)$ may be an output value of the convolution filter including $p_c$ at a center of the filter, $p_c$ may be a position on a feature vector at which a filter center operation occurs, $w(p_n)$ may be a weight at a $p_n$ position of the filter, $x(p_c+p_n)$ may be an input value at the $p_n$ position based on the $p_c$ position of the input feature vector, and N may be the number of inputs for the convolution filter to be used for operation.

In [Equation 2], p may be an n-th coordinate used by the convolution filter for operation (e.g., in the case of a 3×3 convolution filter, one of (−1, −1), (0, −1), (1, −1), (−1, 0), (1, 0), (−1, 1), (0, 1), (1, 1)).

The main control unit 420 may correct the distortion by applying the convolutional filter to the distorted image photographed by the wide-angle camera 300.

When the main control unit 420 corrects the distortion of the distorted image, the feature extraction unit 440 may calculate feature maps through the convolution operation to perform region inference. The feature extraction unit may use the corrected image.

Figure 5:
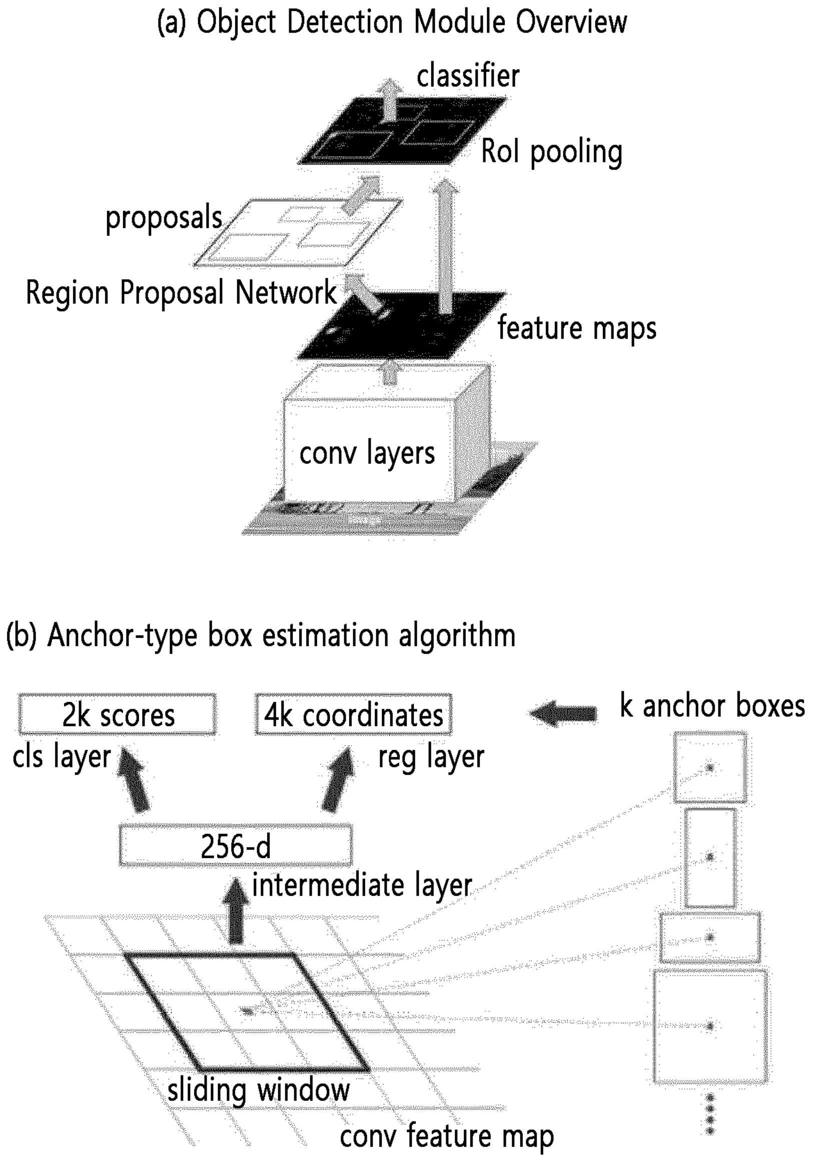
FIG. 5 is a view for explaining an object detection model schematic and an anchor box estimation algorithm of the system for detecting the object in the underground object using the convolutional filter modified to match the camera distortion according to the present disclosure.
Figure 6:
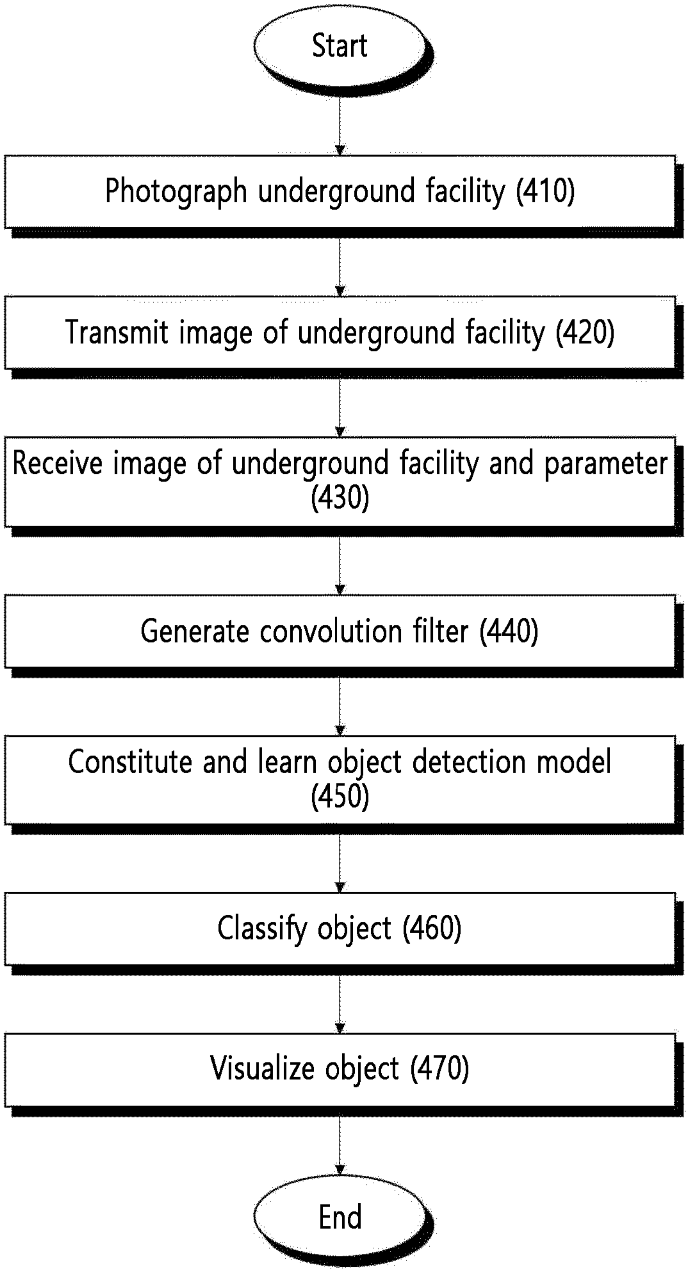
FIG. 6 is a flowchart illustrating a method for detecting an object in an underground space using a convolutional filter modified according to camera distortion according to the present disclosure.

Thereafter, the main control unit 420 may infer regions with high probability, in which the object will exist, from the feature map calculated by the feature extraction unit 440 by using a region proposal network (RPN) algorithm. FIG. 5A illustrates the RPN. Here, to detect objects having various sizes, an object region may be inferred by utilizing anchor boxes having various sizes. FIG. 5B illustrates the anchor boxes having various sizes.

Each of the anchor boxes may have a predetermined shape of an object to be detected. For example, if a vehicle is an object to be detected, an anchor box for the vehicle may be predetermined. People, pipes, lanes, and cabinets may the same. The anchor box may refer to a method of assigning the most similar one among a plurality of different boxes when an object is detected.

The anchor box may mean a box in which a predetermined object is likely. The anchor box may play several roles in object detection. The anchor box may be used to detect all overlapping objects. For example, the vehicle in a lateral direction and the person in a longitudinal direction may overlap each other. Here, both the objects may be detected using several, tens, thousands, or tens of thousands of anchor boxes having various aspect ratios and scales so as to detect both the objects.

The main control unit 420 may move the sliding window having the same size. When the sliding window is applied to a center of the anchor box, it may be determined whether the object is included in the anchor box. For example, in the acquired anchor box, a separate convolutional layer may be used to proceed with binary classification for determining whether the anchor box is an object. When the acquired anchor box is an object, accurate bounding box coordinates may be predicted by applying bounding box regression.

Thereafter, a region in which the object is disposed may be extracted through a region of interest pooling. Then, the region in which the object is disposed is converted into a feature map having a fixed size.

The object classification module 450 may perform at least one of an input of the feature map, classification what kind of object contained in the inferred region, or classification which objects are contained in the region by using the convolutional layer. The object classification module 450 may perform all of the above processes.

The present disclosure may provide a system without the need for preprocessing. In the system and the method for detecting the underground facility using the convolutional filter modified to match the camera distortion according to the present disclosure, the object may be detected using the modified convolutional filter without the preprocessing. Here, the preprocessing may refer to a process of removing the distortion of the distorted image. The preprocessing may refer to processing required to correspond to the camera distortion. The preprocessing may be performed before passing through the feature extraction unit 440. In this embodiment, since the distorted image is used as it is, the preprocessing may not be necessary.

Hereinafter, the system without the need for the preprocessing will be described in detail.

When image optical distortion occurs, a position (x, y) of a coordinate pair of a distorted point may be expressed by [Equation 3] below.

$$x_{dsitortedcoordinate} = x(1 + k_1 r^2 + k_2 r^4 + k_3 r^6) \qquad \text{[Equation 3]}$$
$$y_{dsitortedcoordinate} = y(1 + k_1 r^2 + k_2 r^4 + k_3 r^6)$$

As a result, when the image optical distortion occurs, it is modified into a distorted point coordinate pair as shown in Equation 3 above. Thus, performance of detection of the underground facility may be deteriorated.

The x, y coordinates distorted by [Equation 3] may be expressed as in [Equation 4] below.

$$\Delta x = -x(k_1 r^2 + k_2 r^4 + k_3 r^6) \qquad \text{[Equation 4]}$$
$$\Delta y = -y(k_1 r^2 + k_2 r^4 + k_3 r^6)$$

In [Equation 3] and [Equation 4], each k may be a lens-related parameter. For example, each k may be a camera parameter. For example, each k may be a focal length, an angle of view, and a relative aperture value. To solve the distortion coordinates (Δx, Δy) from the viewpoint of the convolutional filter, the distortion may be corrected through a position $\Delta p_n$ of the filter. The $\Delta p_n$ may be a modified position of the position $\Delta p_n$ used for calculation and may be calculated by [Equation 5] below.

$$\Delta p_n = \Delta p_{n+c} - \Delta p_c \quad \text{[Equation 5]}$$

Here, each of the $\Delta p_{n+c}$ and the $\Delta p_c$ is a coordinate ($\Delta x$, $\Delta y$) for each position.

When substituting [Equation 5] into [Equation 2], a convolutional filter operation expression such as [Equation 6] below may be calculated.

$$y(p_c) = \sum_{p_n \in N} w(p_n) \cdot x(p_c + p_n + \Delta p_n) \quad \text{[Equation 6]}$$

The main control unit 420 of the system for detecting the underground facility using the convolution filter modified to match the camera distortion according to the present disclosure may use the convolution filter of [Equation 6] instead of the convolution filter of [Equation 2]. As a result, the processing may not be necessary. In other words, instead of the convolutional filter of [Equation 2] in $f_1$ (a function of a first layer of the convolutional layer) of [Equation 1] that receives the distorted image as an input, the modified convolutional filter of [Equation 6] that is the convolutional filter modified to match the camera distortion may be used. As a result, distortion of an image photographed by the wide-angle camera 300 may be resolved.

A detection method by the system for detecting the object in the underground space using the convolutional filter modified to match the camera distortion according to the present disclosure, which has the configuration as described above will be described.

The wide-angle camera 200 mounted on the movable body 100 moving in the underground space may perform a process (S100) of photographing an underground facility.

The movable body 100 may perform a process of acquiring an image of the underground facility, which is photographed by the wide-angle camera 200 to transmit the image to the object detection terminal 400 (S200).

The object detection terminal 400 may perform a process of receiving the image of the underground facility, which is photographed by the wide-angle camera 200 and parameters of the camera used at this time from the movable body 100 (S300). The image and the parameters may be stored in advance instead of the reception.

The convolution filter generation unit 430 of the object detection terminal 400 may perform a process of generating a convolution filter that matches a distortion shape of the camera with the camera parameters (S400).

The object detection terminal 400 may constitute an object detection model and perform a process of learning the object detection model (S500).

The object detection terminal 400 may perform a process of receiving a feature map as an input, classifying an object contained in the inferred region as an object, and classifying which object is contained in the corresponding region using a convolutional layer (S600).

The object detection terminal 400 may perform a process of visualizing an object into an object bounding box (S700).

According to the embodiment, the underground facility may be more accurately detected.

The system and method for detecting the underground facility using the convolutional filter modified to match the camera distortion according to the present disclosure may have the effect of robustly detecting the object in the image with the large change in size of the object formed on the image according to the distortion and the distance such as the wide-angle or omnidirectional camera.

The system and method for detecting the underground facility using the convolutional filter modified to match the camera distortion according to the present disclosure may have the effect of detecting and diagnosing the facilities or establishments disposed on both surfaces at once because the facilities on the wide region are detected using only one wide-angle device.

The system and method for detecting the underground facility using the convolutional filter modified to match the camera distortion according to the present disclosure may have the effect of being deformed in response to all the camera-specific parameters, being deformed even if the size or shape of the same object is different, and detecting the object on the image having the wide region with the excellent performance by using the wide-angle camera.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A system for detecting an object in an underground space, the system comprising:

a movable body moving in the underground space;

a camera mounted on the movable body to photograph a first image containing at least one object placed in the underground space;

an object detection terminal configured to receive the first image and a parameter of the camera, generate a first convolution filter based on the parameter of the camera, wherein sampling positions of the first convolution filter are modified according to distortion of the camera, perform a first convolution operation on the first image using the first convolution filter without performing distortion correction preprocessing, perform a second convolution operation on an output of the first convolution operation using a second convolution filter different from the first convolution filter to generate a feature map, and detect a first object that is a preset object and is comprised in the at least one object and a second object that is different from the first object, is a preset object, and is comprised in the at least one object, based on the feature map; and a communication network configured to enable network communication between the movable body and the object detection terminal.

2. The system according to claim 1, wherein each of the first object and the second object comprises at least one of a person, a vehicle, or an underground facility.

3. The system according to claim 1, wherein the first image comprises a distorted image.

4. The system according to claim 1, wherein the camera comprises a wide-angle camera.

5. The system according to claim 1, wherein the wide-angle camera uses at least one of a wide-angle lens or an ultra-wide-angle lens.

6. The system according to claim 1, wherein the object detection terminal is configured to detect a plurality of objects comprising the first object and the second object.

7. The system according to claim 1, wherein the object detection terminal comprises:

a communication unit configured to communicate with the moving object and receive the first image acquired by being captured by the camera;

a convolution filter generation unit configured to generate a first convolution filter based on a parameter of the camera, wherein sampling positions of the first convolution filter are modified according to distortion of the camera;

a main control unit configured to perform a first convolution operation on the first image using the first convolution filter without performing distortion correction preprocessing;

a feature extraction unit configured to perform a second convolution operation on an output of the first convolution operation using a second convolution filter different from the first convolution filter to generate a feature map; and an object classification module configured to receive the feature map as an input so as to classify the first object and the second object based on the feature map.

8. The system according to claim 7, wherein, when the first convolution filter is applied to the first image, the main control unit uses the following Equation:

$$y(pc) = \sum (pn \in N)\ w(pn) \cdot x(pc + pn)$$

where, x is an input of an i-th layer, y is an output of the i-th layer, y(pc) is an output value of the first convolution filter comprising pc at a center of the filter, pc is a position on a feature vector at which a filter center operation occurs, w(pn) is a weight at a pn position of the filter, x(pc+pn) is an input value at the pn position based on the pc position of the input feature vector, and N is the number of inputs for the first convolution filter to be used for operation.

9. The system according to claim 7, wherein the main control unit is configured to infer regions with high probability, in which at least one of the first object and the second object exists, from the feature map calculated by the feature extraction unit.

10. The system according to claim 9, wherein the main control unit is configured to infer an object region by utilizing a plurality of different anchor boxes so as to detect the first object and the second object.

11. The system according to claim 10, wherein the main control unit is configured to use an RPN algorithm.

12. The system according to claim 7, wherein the convolution filter generation unit is configured to generate the first convolution filter configured to correct distortion due to a parameter of the camera.

13. The system according to claim 12, wherein the parameter of the camera comprises at least one of a focal length of a lens used in the camera, an angle of view of the camera, and a relative aperture of the camera.

14. The system according to claim 7, wherein the convolution filter generation unit is configured to generate the first convolution filter configured to correct distortion due to a parameter of the camera, which comprises a focal length of a lens, an angle of view of the camera, and a relative aperture of the camera.

15. A system for detecting an object in an underground space, the system comprising:

a movable body moving in the underground space;

a camera mounted on the movable body to photograph a first image containing at least one object placed in the underground space;

an object detection terminal configured to receive the first image; and a communication network configured to enable network communication between the movable body and the object detection terminal, wherein the object detection terminal comprises a main control unit configured to perform a convolution operation on the first image using a first convolution filter, wherein the convolution operation is defined by:

$$y(p_c) = \sum (p_n \in N)\ w(p_n) \cdot x(p_c + p_n + \Delta p_n)$$

where, x is an input of an i-th layer, y is an output of the i-th layer, $y(p_c)$ is an output value of the convolution filter comprising $p_c$ at a center of the filter, $p_c$ is a position on a feature vector at which a filter center operation occurs, $w(p_n)$ is a weight at a $p_n$ position of the filter, $x(p_c+p_n)$ is an input value at the $p_n$ position based on the $p_c$ position of the input feature vector, N is the number of inputs for the convolution filter to be used for operation, and $\Delta p_n$ is a position of the filter, wherein $\Delta p_n$ is determined based on a parameter of the camera, and wherein the object detection terminal is configured to detect an object comprised in the first image based on an output of the convolution operation.

16. The system according to claim 15, wherein the Δpn is calculated by the following Equation:

$$\Delta pn = \Delta p(n + c) - \Delta pc$$

where, each of the Δp(n+c) and the Δpc is a coordinate (Δx, Δy) for each position.

17. A method for detecting an object in an underground space, the method comprising:

(a) photographing an underground facility by a camera mounted on a movable body;

(b) acquiring a first image photographed by the camera to transmit the first image to an object detection terminal;

(c) allowing the object detection terminal to receive the first image and a parameter of the camera;

(d) allowing the object detection terminal to generate a first convolution filter based on the parameter of the camera, wherein sampling positions of the first convolution filter are modified according to distortion of the camera and generate a second image from the first image using the first convolution filter without performing distortion correction preprocessing;

(e) allowing the object detection terminal to calculate a feature map through a second convolution operation using a second convolution filter different from the first convolution filter so as to infer a region from the second image;

(f) allowing the object detection terminal to classify which object is comprised in an inferred region using the feature map and classify which object is comprised in a corresponding region using a convolutional layer; and (g) allowing the object detection terminal to visualize the object into an object bounding box.

18. The method according to claim 17, wherein the parameter of the camera is acquired by the object detection terminal before generating the first convolution filter.

19. The method according to claim 17, wherein the first convolutional filter is provided as the following Equation:

$$y(pc) = \sum (pn \in N)\ w(pn) \cdot x(pc + pn)$$

where, x is an input of an i-th layer, y is an output of the i-th layer, y(pc) is an output value of the first convolution filter comprising pc at a center of the filter, pc is a position on a feature vector at which a filter center operation occurs, w(pn) is a weight at a pn position of the filter, x(pc+pn) is an input value at the pn position based on the pc position of the input feature vector, and N is the number of inputs for the first convolution filter to be used for operation.

20. The method according to claim 17, wherein the first convolution filter is provided as the following Equation:

$$y(pc) = \sum (pn \in N)\ w(pn) \cdot x(pc + pn + \Delta pn)$$

where, x is an input of an i-th layer, y is an output of the i-th layer, y(pc) is an output value of the first convolution filter comprising pc at a center of the filter, pc is a position on a feature vector at which a filter center operation occurs, w(pn) is a weight at a pn position of the filter, x(pc+pn) is an input value at the pn position based on the pc position of the input feature vector, N is the number of inputs for the first convolution filter to be used for operation, and Δpn is a position of the filter.

* * * * *